United States Patent
Butera et al.

(10) Patent No.: US 6,843,716 B2
(45) Date of Patent: Jan. 18, 2005

(54) AIR DISTRIBUTION SYSTEM FOR A MOTOR VEHICLE

(75) Inventors: Francesco Butera, Turin (IT); Marco Biasiotto, Turin (IT); Stefano Alacqua, Rivoli (IT)

(73) Assignee: CRF Societa Consortile Per Azioni, Turin (IT)

( * ) Notice: Subject to any disclaimer, the term of this patent is extended or adjusted under 35 U.S.C. 154(b) by 0 days.

(21) Appl. No.: 10/362,126

(22) PCT Filed: Jun. 25, 2002

(86) PCT No.: PCT/IB02/02391
§ 371 (c)(1),
(2), (4) Date: Feb. 21, 2003

(87) PCT Pub. No.: WO03/002362
PCT Pub. Date: Jan. 9, 2003

(65) Prior Publication Data
US 2003/0157877 A1 Aug. 21, 2003

(30) Foreign Application Priority Data
Jun. 27, 2001 (IT) .................................. TO2001A0619

(51) Int. Cl.⁷ .................................................. B60H 1/26
(52) U.S. Cl. ...................................... 454/121; 454/127
(58) Field of Search .............................. 454/121, 127, 454/152, 156, 159, 160, 161, 153

(56) References Cited

U.S. PATENT DOCUMENTS

| | | | |
|---|---|---|---|
| 3,832,939 A | * 9/1974 | Kakei et al. | ................. 454/125 |
| 4,823,682 A | 4/1989 | Stouffer | |
| 5,067,509 A | 11/1991 | Hunter | |
| 6,582,294 B2 | * 6/2003 | Butera et al. | ................. 454/155 |
| 2002/0164942 A1 | * 11/2002 | Elliot | ......................... 454/121 |

FOREIGN PATENT DOCUMENTS

| | | | |
|---|---|---|---|
| JP | 361122447 A | * | 6/1986 |
| WO | WO 02 072371 A | | 9/2002 |

OTHER PUBLICATIONS

Patent Abstracts of Japan, 62–088606A, Apr. 23, 1987, Noriaki.

* cited by examiner

Primary Examiner—Harold Joyce
(74) Attorney, Agent, or Firm—Sughrue Mion, PLLC

(57) ABSTRACT

A motor-vehicle dashboard incorporating an air distribution system that includes suitable means for controlling the deviation of airflow in the various ducts (3) associated with the outlet vents (2) on the dashboard, using the Coanda effect.

4 Claims, 2 Drawing Sheets

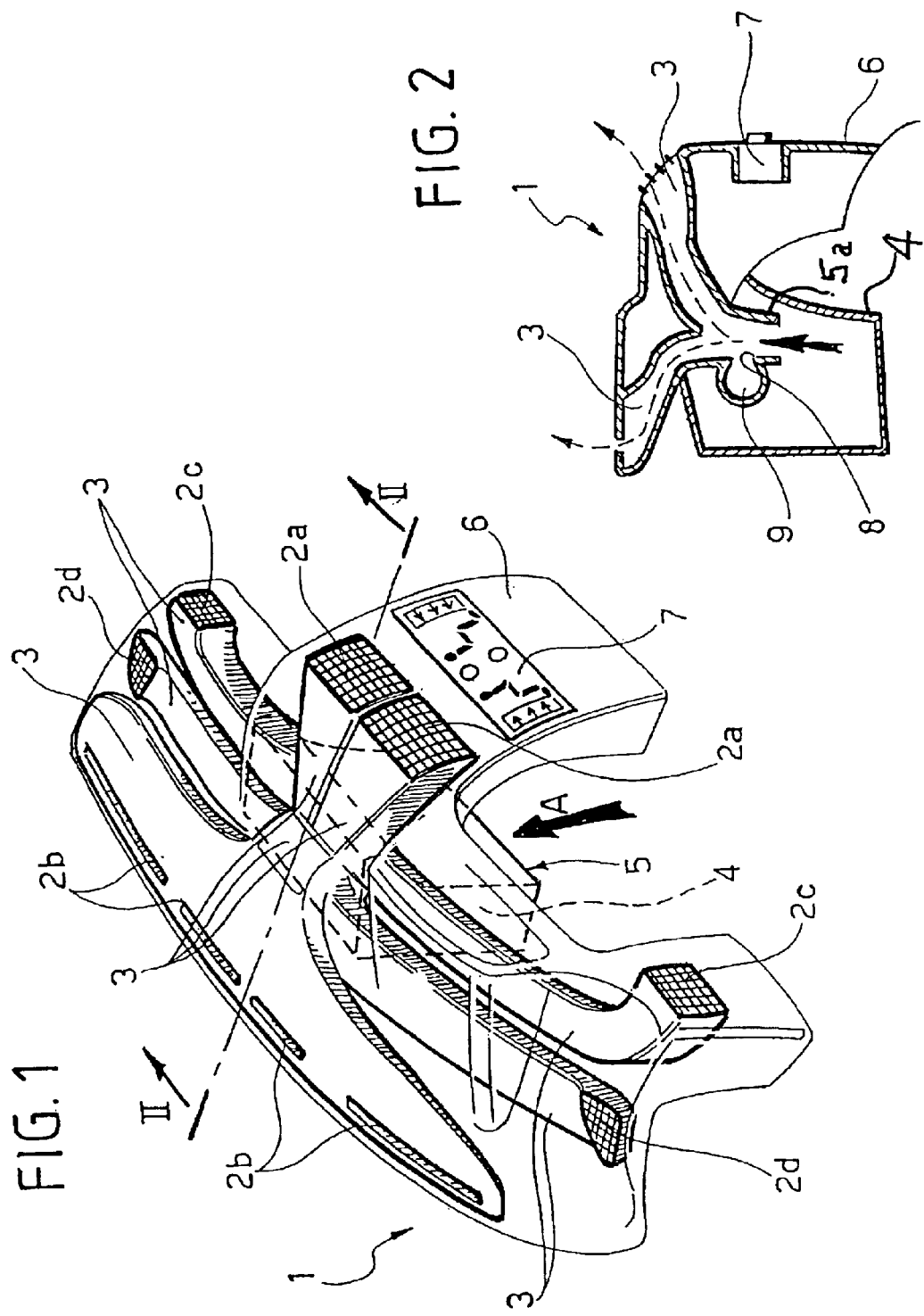

AIR DISTRIBUTION SYSTEM FOR A MOTOR VEHICLE

This is a National Stage Entry of Application No. PCT/IB02/02391 filed Jun. 27, 2001; the disclosure of which is incorporated herein by reference.

BACKGROUND OF THE INVENTION

The present invention refers to air distribution systems for motor vehicles, of the type that include:

at least one airflow inlet duct, a number of air outlet vents in the motor vehicle's driver and passenger compartment, and an air distribution device, including:

an inlet that receives airflow from the said inlet duct, and a number of outlets situated away from the said outlet vents and connected to them by respective ducts.

SUMMARY OF THE INVENTION

The object of this invention is that of realizing an air distribution system of the above-specified type that is simple and has reliable and efficient operation, whilst simultaneously having easy, quick and low-cost construction and assembly.

In order to achieve these and other objectives, the object of the invention is an air distribution system of the above-indicated type, characterized by the fact that the said distribution device includes suitable means for controlling the direction of airflow using the Coanda effect and by the fact that the said distribution device is incorporated in a motor-vehicle dashboard from which the said outlet vents and said ducts are also obtained.

Naturally, the invention also regards the motor-vehicle dashboard incorporating the said device.

It should be noted that an air distribution device incorporating Coanda-effect deviating means has already been proposed by the Applicant in Italian patent application TO2001A000223, filed on Mar. 12, 2001 and still secret at the date of filing this application.

This invention substantially regards a motor-vehicle dashboard incorporating a distribution device of the type forming the subject matter of this application.

BRIEF DESCRIPTION OF THE DRAWINGS

Further characteristics and advantages of the invention will become clear from the description that follows with reference to the enclosed drawings, supplied purely by way of a non-limitative example, where:

FIG. 1 is a schematic perspective view of a first form of embodiment of a motor-vehicle dashboard in accordance with the invention, FIG. 2 is a sectional view along the line II—II of FIG. 1.

DETAILED DESCRIPTION OF THE INVENTION

Figure 4:
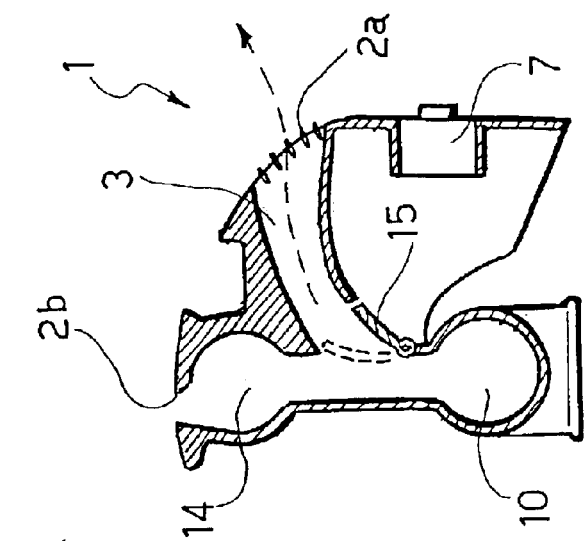
FIG. 4 is a sectional view along the line IV—IV of FIG. 3.

In the drawings, item 1 indicated the motor-vehicle dashboard as a whole, it having a structure realized in the known manner with a body in a plastic material carrying a series of outlet vents for introducing air into the motor-vehicle's driver and passenger compartment, including two front-mounted central outlet vents 2a, a series of outlet slots 2b destined to be located along the bottom edge of the motor vehicle's windscreen, two front-mounted side outlet vents 2c and two lateral outlet vents 2d destined to direct airflow to the inside surfaces of the motor vehicle's front side windows.

All of the said outlet vents 2a–2d are connected by respective ducts 3 to the respective outlets of an air distributor 4 having an lower inlet 5 for a conditioned airflow A, arriving from an air-conditioning device. The dashboard also presents a frontal centre portion 6 carrying a control panel 7.

With reference to FIG. 2, the lower opening 5 includes a series of inlet ducts 5a, each of which branches out into two ducts 3. Deviation of the airflow entering via the ducts 5a into one or the other of the two ducts 3 is determined by the opening or closing of a side opening 8 arranged sideways to the incoming airflow and which communicates with a cylindrical chamber 9, possibly destined to communicate with a source of pressurised air destined to generate a sideways control flow exiting from the opening 8. The opening and closing of the opening 8 is controlled via a rotor-like shutter mounted to rotate inside the chamber 9. The constructional details of this rotor are neither described nor illustrated here, since it can be realized in any manner and also because a form of embodiment of this rotor, is also described and illustrated in the Applicant's previous patent application indicated beforehand, the contents of which are incorporated herein for reference.

Figure 3:
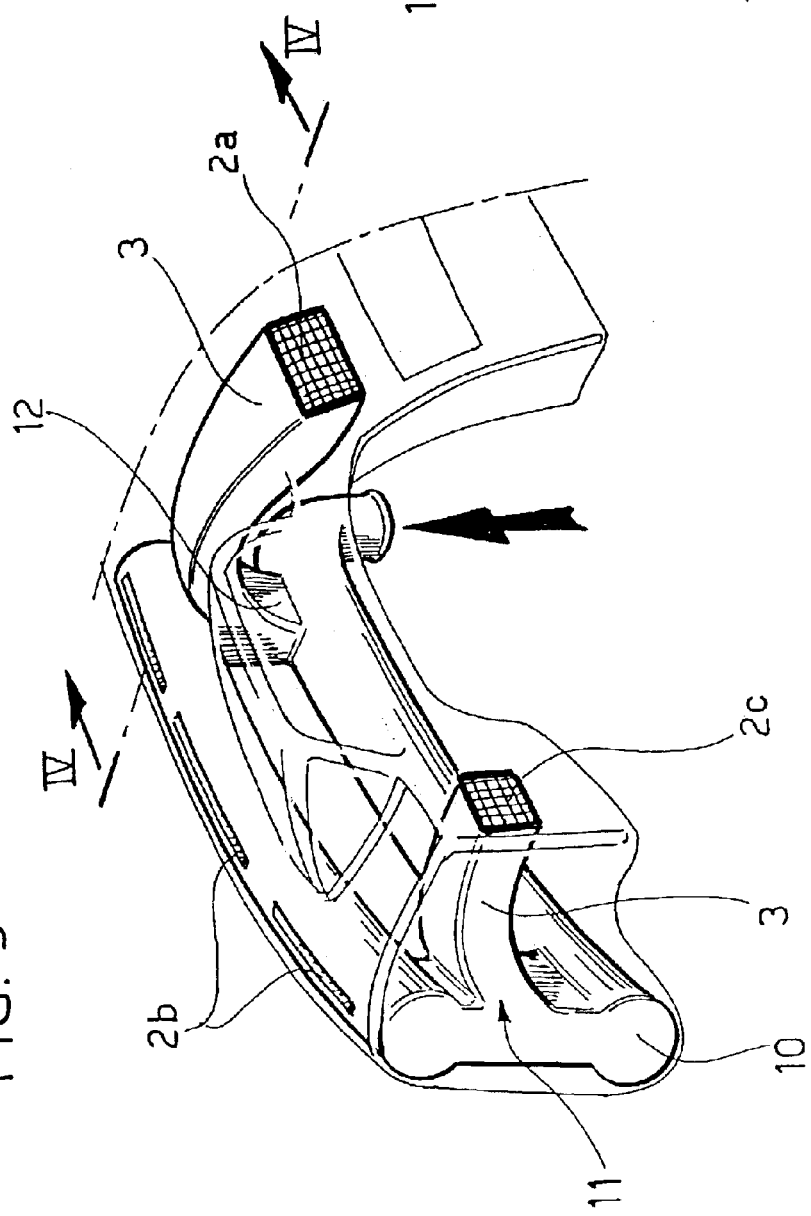
FIG. 3 is a schematic perspective view of a second form of embodiment of a motor-vehicle dashboard in accordance with the invention.

The solution illustrated in FIGS. 3 and 4 only differs from that in FIGS. 1 and 2 by the fact that in the second case, a common manifold channel 10 is set up to receive the conditioned air in input, and along which three distinct distribution elements are situated, consisting of two lateral devices 11 (only one being visible in FIG. 3, which only shows the left-hand part of the dashboard) and one central element 12. In this case, air from the manifold 10 can be sent to an upper manifold 14, communicating with the outlet slots 2b, or to a duct 3 terminating in the front vents 2a via a Coanda-effect control that, in this case, uses a mobile deviator 15. The airflow leaving the manifold 10 adheres to the deviator 15 and follows the curve due to the Coanda effect. Thus, when the deviator 15 is in the condition illustrated by the continuous line in FIG. 4, flush with the side wall of the duct 3, the airflow enters the duct 3, while when the deviator is moved to the position illustrated by the dashed line, it mechanically forces the flow to enter the manifold 14, from where it attracts it again, always due to the Coanda effect, the moment in which the deviator 15 is returned to the start condition.

As can be seen, the dashboard in accordance with the invention is realized as a single group, which can be pre-assembled, incorporating a Coanda-effect air distribution system that presents significant characteristics from the viewpoints of operational simplicity and efficiency.

Naturally, the principle of the invention being understood, the constructional details and forms of embodiment could be extensively changed with respect to that described and illustrated by way of example without leaving the scope of this invention.

It is also possible to consider Coanda-effect deviating means of the type illustrated in another pending application by the same Applicant, using a mobile wall between a position in which it is incorporated in a side wall of a duct, and a position where it extends into the duct to produce an step-like irregularity on the internal surface of the duct.

What is claimed is:

1. An air distribution system for a motor vehicle, including:
   at least one airflow inlet duct (5),
   a number of air outlet vents (2) in the motor vehicle's driver and passenger compartment, and
   an air distribution device (4), including:
   an inlet (5a) that receives airflow from the inlet duct (5), and
   a number of outlets situated away from the outlet vents (2) and connected to them by respective ducts (3),
   wherein the distribution device (4) includes suitable means (8 and 15) for controlling the deviation of the incoming airflow via the Coanda effect, and by the fact that the distribution device (4) is incorporated into a motor-vehicle dashboard from which the outlet vents (2) and the ducts (3) extend and
   wherein the Coanda-effect means include a wall that can be moved between a position in which it is incorporated in a side wall of one of said ducts, and a position where it extends into said one of said ducts to produce a step-like irregularity on the internal surface of one of said ducts.

2. A distribution system according to claim 1, wherein the air distribution device comprises a single body (4).

3. A distribution system according to claim 1, wherein the air distribution device (4) includes an inlet manifold (10) and multiple Coanda-effect distribution elements (11 and 12) arranged along the length of this manifold (10).

4. An air distribution system for a motor vehicle including:
   at least one air flow inlet duct,
   a number of air outlet vents in the motor vehicles' driver and passenger compartment, and
   an air distribution device including an inlet that receives air flow from the inlet duct and
   a number of outlets situated away from the outlet vents and connected to them by respective ducts, wherein the distribution device includes means for controlling the deviation of the incoming air flow via the Coanda Effect,
   wherein the Coanda Effect deviating means is comprised of movable wall having a curved shape disposed in the inlet duct for controlling the direction of substantially the entire airflow in the inlet duct by the Coanda Effect.

* * * * *